(12) United States Patent
Aoyama

(10) Patent No.: US 6,882,962 B2
(45) Date of Patent: Apr. 19, 2005

(54) MAINTENANCE METHOD AND MAINTENANCE SYSTEM FOR INDUSTRIAL MACHINERY

(75) Inventor: Kouki Aoyama, Kariya (JP)

(73) Assignee: Yutaka Electronics Industry Co., Ltd., Kariya (JP)

( * ) Notice: Subject to any disclaimer, the term of this patent is extended or adjusted under 35 U.S.C. 154(b) by 374 days.

(21) Appl. No.: 09/862,340

(22) Filed: May 23, 2001

(65) Prior Publication Data

US 2001/0047504 A1 Nov. 29, 2001

(30) Foreign Application Priority Data

| May 26, 2000 | (JP) | ........................................ | 2000-157220 |
| Jul. 26, 2000 | (JP) | ........................................ | 2000-225933 |

(51) Int. Cl.$^7$ .............................................. G06F 11/30
(52) U.S. Cl. ...................................... 702/185; 340/635
(58) Field of Search .......................... 340/635; 706/50; 702/185; 700/95; 709/250; 356/237.1

(56) References Cited

U.S. PATENT DOCUMENTS

| 5,754,451 A | * | 5/1998 | Williams ..................... 702/185 |
| 5,841,530 A | * | 11/1998 | Hewitt et al. ............. 356/237.1 |
| 5,845,272 A | * | 12/1998 | Morjaria et al. ............... 706/50 |
| 5,917,726 A | * | 6/1999 | Pryor ........................... 700/95 |
| 6,297,742 B1 | * | 10/2001 | Canada et al. .............. 340/635 |
| 6,507,765 B1 | * | 1/2003 | Hopkins et al. .............. 700/95 |
| 6,574,672 B1 | * | 6/2003 | Mitchell et al. ............ 709/250 |

* cited by examiner

*Primary Examiner*—John Barlow
*Assistant Examiner*—Xiuqin Sun
(74) *Attorney, Agent, or Firm*—Squire, Sanders & Dempsey L.L.P.

(57) ABSTRACT

At the same time as establishing a means of recording operation data 4, to record the operation data of robots 2 and 2· ·, monitor cameras 5 and 5· ·, to film the operation status of robots 2 and 2· ·, and a means of recording visual data 6 and 6· ·, to record said visual data from said monitor cameras, a central computer 7 is installed, into which an advisor can collect both said operation data and said visual data by means of the Internet N, wherein, if an error occurs in either robot 2 or robot 2· ·, the advisor is able to collect operation data and visual data from before and after the occurrence of the error into said central computer 7, analyze both said types of data in order to investigate the cause of the error, following which, images of the site filmed by monitor camera 5 can be downloaded by means of the Internet N, wherein said advisor is able to issue instructions to an on-site operator as to the recovery procedure for robot 2, while said advisor is referring to said filmed images for verification.

7 Claims, 4 Drawing Sheets

MAINTENANCE METHOD AND MAINTENANCE SYSTEM FOR INDUSTRIAL MACHINERY

BACKGROUND

1. Field of the Invention

The invention is a maintenance method for industrial machinery (machinery which is operated by computer control) for the resolution of errors arising in said industrial machinery, and a maintenance system for the realization of the above.

2. Related Art

If some kind of error occurs in industrial machinery, such as working robots that are operated within a factory, or engineering machinery, the machinery may stop or may fail to operate normally. Previously, in such cases, an engineer able to resolve the error was called to the site to carry out repairs. Alternatively, an on-site operator would attempt repairs, while referring to an instructions manual or the like.

However, when an engineer able to resolve the error is in a location removed from the site, it takes time for the engineer to reach the site. Further, even if operators with little specialist knowledge of the machinery refer to an instructions manual or the like, in many cases, the construction of the machinery is complex and therefore repairs require a great amount of time. During such time, cessation of operations cannot be avoided, and, particularly if an error occurs in a working robot, which is part of a production line or so on, this can cause massive losses. In addition, when operators with little specialist knowledge of the machinery carry out repairs, there are concerns that they could be involved in an accident due to unexpected movements of the machinery.

SUMMARY OF THE INVENTION

Accordingly, it is an object of this invention to provide a maintenance method for industrial machinery, wherein errors arising in industrial machinery, such as working robots and so on, are smoothly and rapidly resolved, and a maintenance system for the realization of this object.

The present invention is a maintenance method for industrial machinery for the resolution of errors arising in said industrial machinery, comprising: constant recording of operation data of aforementioned industrial machinery during operation of said industrial machinery, wherein, if an error occurs, the operation data before and after the error arises in said industrial machinery is collected from dispersed locations by means of a telecommunications circuit, and wherein said operation data is analyzed in order to investigate the cause of the error in said industrial machinery.

Further, a maintenance method according to the invention is one, wherein, at the same time as the constant recording of the operation data of said industrial machinery, the operation status is also constantly filmed, wherein, if an error occurs, both said operation data before and after the error occurs in said industrial machinery and said visual data of the filmed operation status before and after the error occurs in said industrial machinery are collected by means of a telecommunications circuit, and wherein both said operation data and visual data are analyzed in order to investigate the cause of the error in said industrial machinery. Further, the maintenance method of the invention is one wherein, after the investigation into the cause of the error in said industrial machinery, on-site operators are notified of the recovery procedure for said industrial machinery, based on the results of said investigation. Further, the maintenance method of the invention is such that wherein after the investigation into the cause of the error in said industrial machinery, images of the site are downloaded by means of a telecommunications circuit, and notification of the recovery procedure is carried out while referring to said filmed images for verification.

The maintenance method as set forth in claim 5, comprising: filming of the operation status of said industrial machinery following the occurrence of an error, wherein said filmed images are downloaded from dispersed locations by means of a telecommunications circuit, and wherein on-site operators are instructed as to the recovery procedure of said industrial machinery, while said filmed images are being referred to for verification. Further, the maintenance method as set forth in claim 6, in relation to the method as set forth in claim 5, wherein, at the same time as images of the operation status filmed following the occurrence of an error in said industrial machinery, operation data following the occurrence of the error are acquired, wherein both said filmed images and operation data are downloaded from dispersed locations by means of a telecommunications circuit, wherein said operation data are analyzed in order to investigate the cause of said error, and wherein instructions are issued as to the recovery procedure of said industrial machinery, based on the results of said investigation.

Further, the invention comprises a maintenance system for industrial machinery composed such that at the time of an error occurring in the industrial machinery, an advisor removed from the site is able to instruct on-site operators as to the recovery procedure for said industrial machinery, the maintenance system comprising: a means of operation data acquisition from said industrial machinery, a central computer into which, by means of a telecommunications circuit, the advisor can collect the operation data acquired by said means of operation data acquisition and a means of communication for the advisor to issue instructions to on-site operators. Further, the maintenance system of the invention is such that at the same time as establishing a means of filming the site, the downloading of said filmed images into a central computer is possible by means of a telecommunications circuit. In addition, the maintenance system as set forth in claim 5 is composed such that, in addition to the composition as set forth in claim 4, at the same time as establishing a means of recording visual data to record images filmed by said means of filming, the advisor is able to download said visual data recorded on said means of recording visual data into said central computer by means of a telecommunications circuit, and said advisor is also able to replay said visual data on said central computer. The maintenance system also includes, in another embodiment, a configuration wherein the advisor is able to carry out panning and zooming operations of said means of filming by means of a telecommunications circuit.

DETAILED DESCRIPTION OF THE PREFERRED EMBODIMENTS

Figure 1:
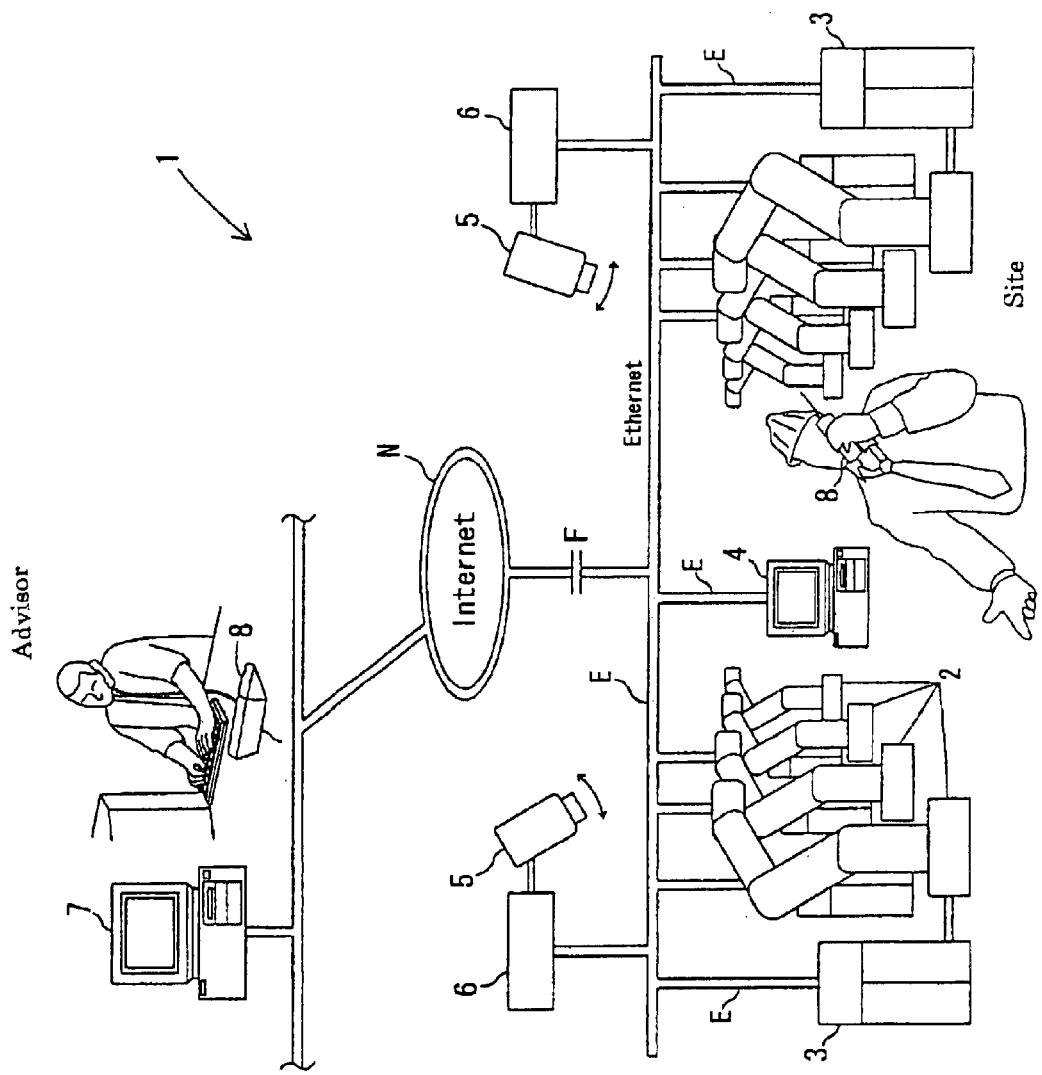
FIG. 1 is a schematic diagram illustrating a working format for the maintenance system for industrial machinery of the invention.

Below, preferred embodiments of the invented maintenance system for industrial machinery are described, based on the drawings. Here, one example of a working format is given, describing a case of a working robot as part of a production line, with said maintenance system making use of the Internet. FIG. 1 is a schematic diagram for the maintenance system 1 of the invention, describing said maintenance system, wherein at the time of an error occurring in said working robot 2 (hereafter simply referred to as robot), an advisor receives a request from the site, and uses Internet N as a telecommunications circuit in order to collect operation data and visual data of said robot 2 before and after the occurrence of the error into central computer 7, wherein both said data are analyzed in order to investigate the cause of the error, and wherein the advisor is able to instruct on-site operators as to the procedure for resolving the error (recovery procedure). The following gives a detailed description.

Robots 2 and 2 · · and robot controllers 3 and 3 · · which control said robots 2 and 2 · ·, are installed at each site, and a means of recording operation data 4, which acquires and records operation data from each robot 2 and 2 · ·, a means of filming in the form of monitor cameras 5 and 5 · ·, which film the operation status of each robot 2 and 2 · ·, and a means of recording visual data 6 and 6 · ·, which record said filmed images are also installed. Monitor camera 5 is able to carry out panning and zooming operations by receiving commands from an external terminal. Further, said robot controllers 3 and 3 · ·, said means of recording operation data 4, said monitor cameras 5 and 5 · ·, and said means of recording visual data 6 and 6 · ·, are connected to a bus configuration Ethernet, E. Ethernet E is connected to Internet N by means of a firewall F, and only the advisor knows the secret identification code. Please note that in FIG. 1, only two monitor cameras 5 and two means of recording visual data 6 are indicated.

A central computer 7 is installed, in order for the advisor to access means of recording operation data 4, monitor cameras 5 and 5 · ·, and means of recording visual data 6 and 6 · · via the Internet N or Ethernet E. Said central computer 7 has an internal mechanism for replaying on screen visual data downloaded from said means of recording visual data 6, is able to download filmed images of the site in real time as filmed by monitor camera 5, and is also able to replay on screen past robot 2 operation status as recorded by means of recording visual data 6. Further, commands can be issued from said central computer 7 to monitor camera 5, by means of Internet N, in order to carry out panning and zooming operations. A means of communication 8 is installed in the vicinity of said central computer 7, in order to issue instructions to on-site operators.

Figure 2:
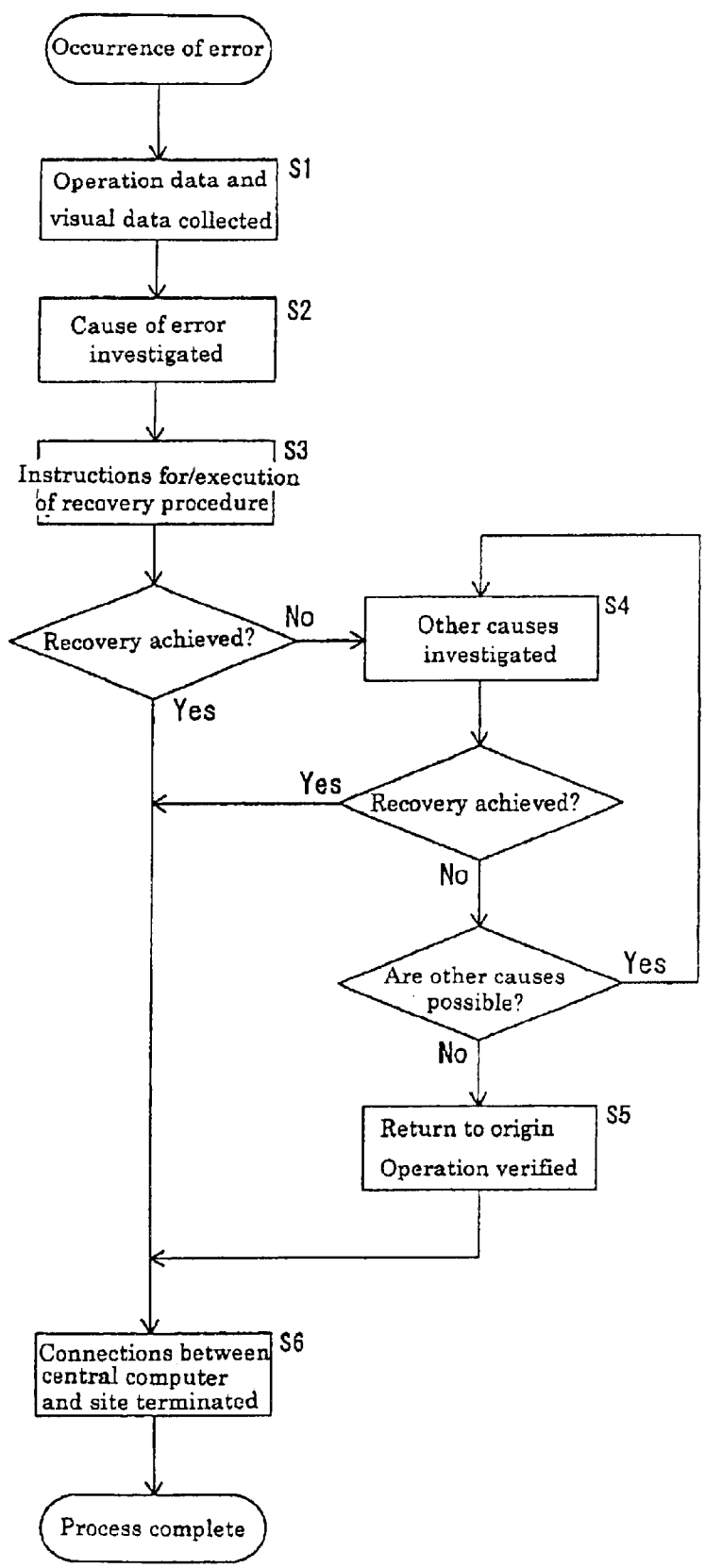
FIG. 2 is a flowchart of the maintenance method for industrial machinery of the invention.

The maintenance method for robots 2 and 2 · · using the maintenance system 1 of the invention is described in the flow chart in FIG. 2. The aforementioned means of recording operation data 4 is used to continuously acquire and record operation data during the operation of the targets of maintenance, robots 2 and 2 · ·, and at the same time, the aforementioned monitor cameras 5 and 5 · · are used to continuously film the operation status of robots 2 and 2 · ·, said filmed images being recorded by means of recording visual data 6 and 6 · ·. If any error occurs in either robot 2 or 2 · ·, a request is immediately made to the advisor for instructions as to the recovery procedure. The advisor, upon receiving said request, as step 1, first accesses the means of recording operation data 4 via the Internet N and Ethernet E from the central computer 7, and at the same time as collecting the operation data from robot 2 before and after the occurrence of the error, the advisor also accesses the means of recording visual data 6 and downloads, in the same manner, visual data of robot 2 before and after the occurrence of the error, replaying said data on screen. As step 2, both said operation data and visual data are analyzed in order to investigate the cause of said error. During that time, an on-site operator who receives instructions from the advisor as to executing the recovery procedure, prepares a mobile telephone or the like as a means of communication in order to ensure that the instructions from the advisor can be received in real time.

As soon as the advisor has completed the investigation, filmed images of the site currently being filmed by the aforementioned monitor camera 5 are downloaded into the screen of the central computer 7, and as step 3, said advisor issues instructions to on-site operator as to the recovery procedure, while referring to said filmed images for verification, wherein said on-site operator, on receiving said instructions, executes said recovery procedure. At that time, instructions are given while using the panning and zooming operations of the monitor camera 5 as appropriate, for optimum adjustment of the filmed images. As a result, if this does not lead to the recovery of robot 2, other causes are investigated and instructions are re-issued to the on-site operator as to the recovery procedure (step 4). If all possible recovery procedures are executed without leading to recovery, as step 5, the execution of return to origin of said robot 2, or operation verification of said robot 2 is carried out from the aforementioned central computer 7.

As soon as the recovery of said robot 2 is verified, as step 6, connections to said means of recording operation data 4, said monitor camera 5, said means of recording visual data 6 and said central computer 7 are terminated and the process completed. According to the aforementioned maintenance system 1, following the occurrence of an error in robot 2, the advisor is able to carry out an immediate investigation into the cause of the error without going to the site, and further, it is possible to carry out said investigation using both operation data and visual data, thus enabling the rapid and precise resolution of the error in said robot 2. Further, said advisor is able to issue instructions as to the recovery procedure while referring to filmed images of the site for verification, thus improving the safety of recovery operations carried out by on-site operators with little knowledge of robots.

During normal operation of robots 2 and 2 · ·, there is no connection between the site and central computer 7, and further, and no third party apart from the advisor can access the site through firewall F, thus protecting privacy.

Figure 3:
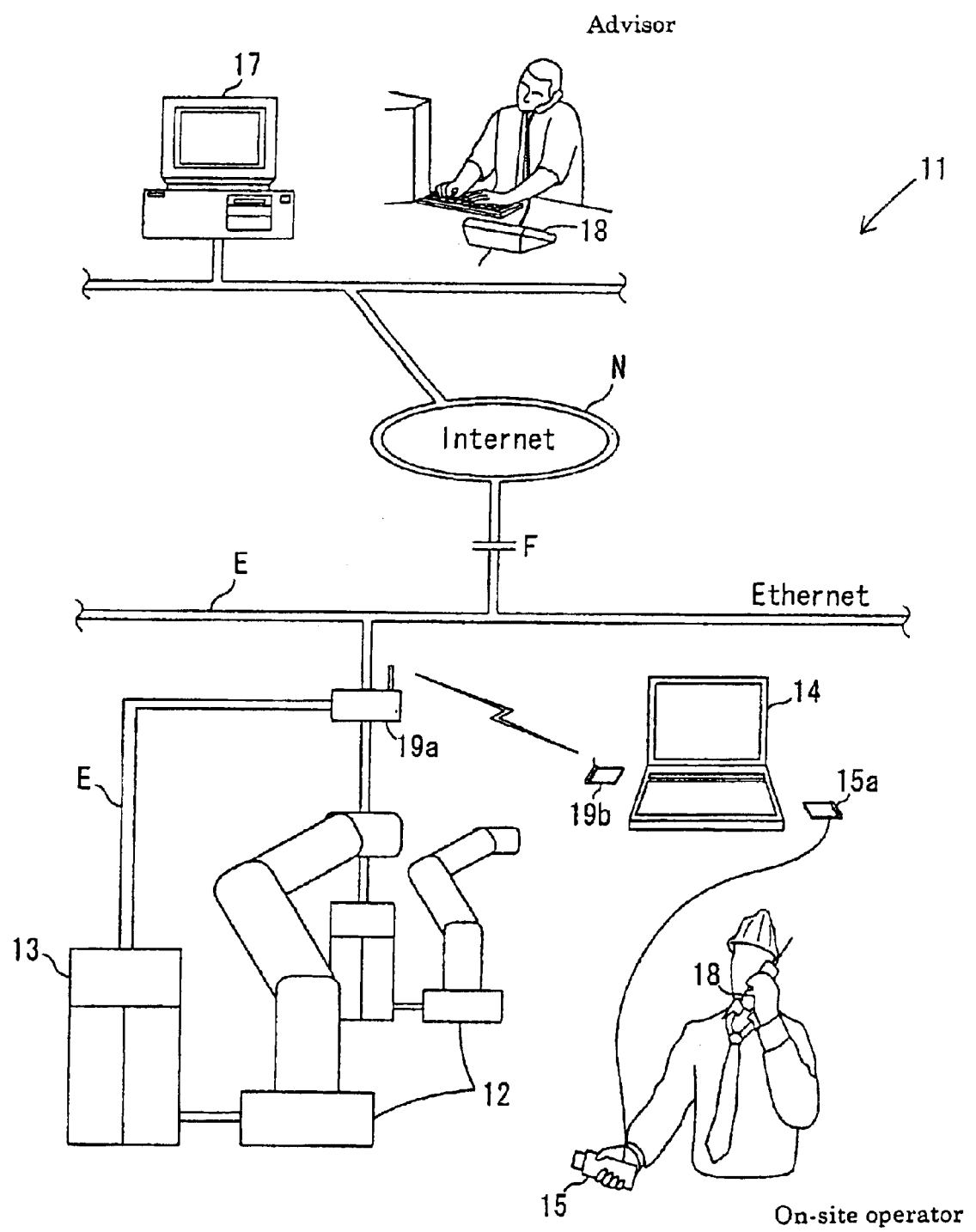
FIG. 3 is a schematic diagram illustrating an alternative working format for the maintenance system for industrial machinery of the invention.

Next, another working format for the maintenance system for industrial machinery of the invention is described, based on FIG. 3. It is possible to refer to this working format as a simplified form of the aforementioned working format 1, a maintenance system wherein the operation data and visual data of robots 12 and 12 · · are not recorded during normal operation, wherein, if an error occurs, upon request from the site, the advisor uses the Internet N to download operation data and visual images of the filmed operation status following the occurrence of the error into central computer 7, wherein said operation data and filmed images are used to investigate the cause of the error, and wherein instructions as to the procedure to resolve the error (recovery procedure) can be issued to an on-site operator. The following gives a detailed description.

Robot controllers 13 and 13 · ·, which control robots 12 and 12 · ·, possess a means of operation data acquisition (not indicated in the drawing) for acquiring the operation data of robots 12 and 12 · ·, wherein said robot controllers 13 and 13 · · are connected to a bus configuration Ethernet E. A wireless router 19a is installed in said Ethernet E in an appropriate position, wherein connection format to the Internet N is the same as described in the aforementioned working format 1.

At the same time as installing a central computer 17 whereby the advisor can access the Ethernet E via the Internet N, a means of communication 18 is also installed in the vicinity of said central computer 17, in order to enable instructions to be issued to an on-site operator.

Figure 4:
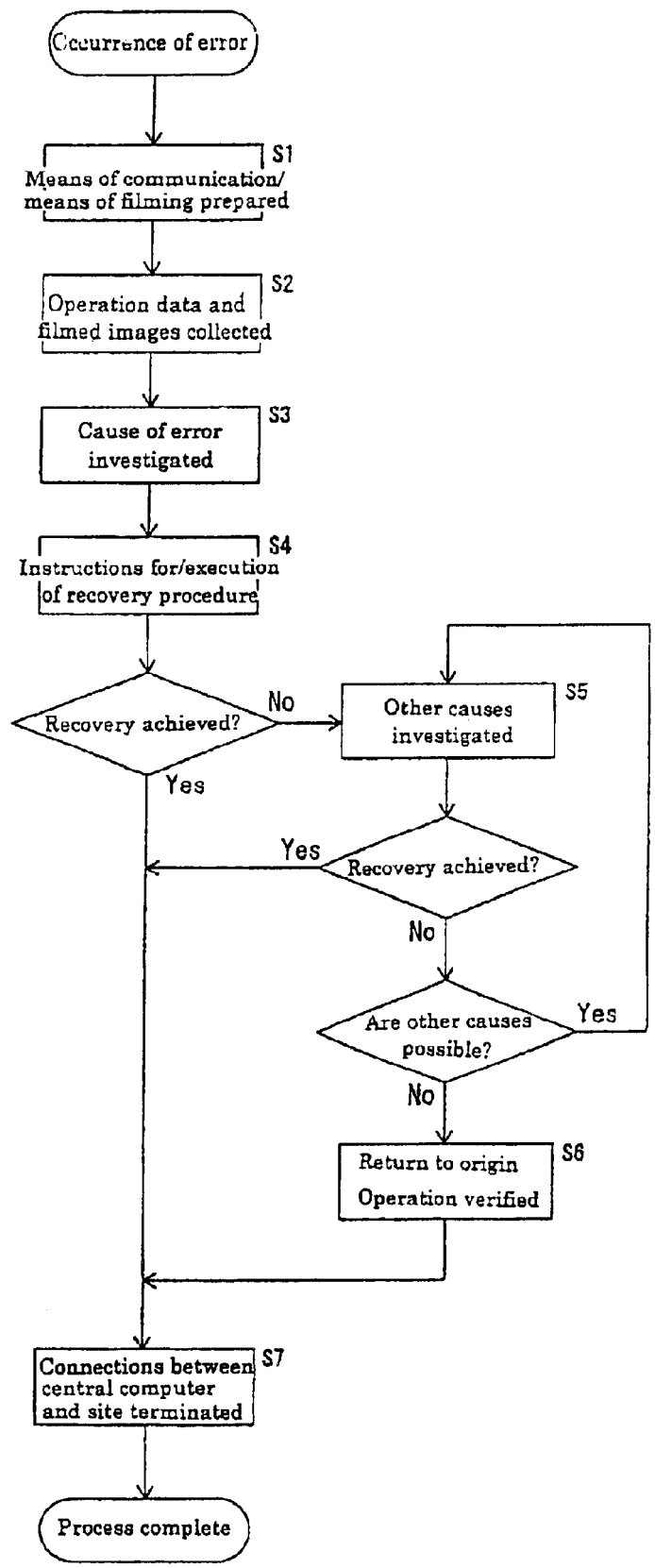
FIG. 4 is a flowchart of the maintenance method for industrial machinery of the invention

The maintenance method for robots 12 and 12 · · using the maintenance system 11 of the invention is described in the flow chart in FIG. 4. If any error occurs in either robot 12 or 12 · ·, as step 1, after the on-site operator has requested the recovery procedure from the advisor, the operator prepares a means of communication 18, such as a mobile phone or the like, then prepares the laptop computer 14 with the wireless LAN card 19b inserted and the transportable camera 15 as a means of filming, connecting both said laptop computer 14 and transportable camera 15 by means of the video capture card 15a. As step 2, the advisor who has received the request, at the same time as downloading the operation data for robot 12 from the internal means of data acquisition installed in robot controller 13 into the central computer 17 via the Internet N and the Ethernet E, accesses the laptop computer 14 from the wireless router 19a to download the filmed images of robot 12 as filmed by the transportable camera 15. Then, as step 3, the advisor analyzes said operation data in order to investigate the cause of the error, and as step 4, based on the results of said investigation, the advisor gives instructions by means of mobile telephone 18 as to the recovery procedure for robot 12, while referring to said filmed images of the site for verification, said recovery procedure being executed by the on-site operator who receives said instructions. As a result, if this does not lead to the recovery of robot 12, other causes are investigated and instructions are re-issued to said on-site operator as to the recovery procedure (step 5). If all possible recovery procedures are executed without leading to recovery, the execution of return to origin of said robot 12, or operation verification of said robot 12 is carried out from the aforementioned central computer 17 (step 6).

As soon as the recovery of said robot 12 is verified, as step 7, connections to said robot controller 13, said laptop computer 14, and said central computer 17 are terminated and the process completed.

According to the aforementioned maintenance system 11, there is no need for a means of constantly recording operation data or a means of constantly recording visual data for robot 12 during normal operation, and it is therefore possible to implement a low cost maintenance system. Further, the advisor, while referring to filmed images of the site for verification, is able to issue instructions as to the recovery procedure, thus improving the safety of recovery operations carried out by operators with little knowledge of robots.

The maintenance system of the invention can be used not only for the maintenance of working robots as described in the aforementioned working formats, but can also be used favorably with various industrial machinery for maintenance or control purposes.

For example, the acquisition of operation data for the following is possible:
(1) Die cast machinery maintenance
(2) Plastic molding injection machinery maintenance
(3) Assembly machinery maintenance
(4) Assembly line maintenance
(5) Cutting/processing machinery maintenance
(6) Cutting line maintenance
(7) Metal press machinery maintenance
(8) CNC machinery maintenance
(9) Generator maintenance/ control
(10) Control of water levels for water supply and sewage, etc.

If it is possible to install a means of filming at the site, which is able to forward images to an external terminal via a telecommunications circuit, the maintenance system of the invention can be implemented in relation to any kind of industrial machinery.

In addition, changes can be made, as appropriate, to the means of recording (acquiring) operation data, the means of filming and the number of installations related to said means of filming, the means of recording visual data, the telecommunications circuit, the central computer, and the means of communication etc. in as far as they do not deviate from the intent of the invention. For example, as for the telecommunications circuit, use could be made not only of the Internet, but a system could be established making use of in-house communications networks, such as intranets or the like, whereby an in-house advisor can collect operation data or visual data and issue instructions. Further, for the connection of the telecommunications circuits with the means of recording operation data, the means of filming, and the means of recording visual data, cables, such as open lines or dedicated lines, or wireless methods, such as mobile phones or personal handy phone systems and so on could be selected, as appropriate, and in particular, a portable laptop computer could be used, for example, as the central computer, whereby if a mobile phone were used as the means of communication, the advisor could rapidly respond to a request from the site, even if said advisor were on the move.

Benefits of the Invention

According to the maintenance method for industrial machinery of the invention it is possible to rapidly investigate the cause of an error occurring in industrial machinery. Also, it is possible to more accurately ascertain the cause of said error occurring in said industrial machinery. Further, according to the maintenance method set forth in the claims, it is possible for an on-site operator to rapidly be informed of the recovery procedure. According to the invention, operators with little knowledge of robots gain improvements in the safety of recovery procedures carried out.

According to the maintenance method for industrial machinery of the invention it is not necessary to have a means of constantly recording operation data or visual data during normal operation of the industrial machinery, thus enabling simple maintenance. Also, accurate ascertainment of the cause of the error is possible by the advisor.

Further, the operational data of the industrial machinery which is under maintenance is constantly acquired and recorded during operation of said industrial machinery, wherein, if an error occurs, an advisor, even if said advisor is in a location removed from the site, is able to rapidly and smoothly issue instructions to an on-site operator as to the recovery procedure. Further, according to the maintenance system of the invention, the advisor can issue instructions to the on-site operator as to the recovery procedure while referring to the situation at said site for verification. Further, the operation status of the industrial machinery is constantly filmed and the visual data recorded, wherein the advisor is able to investigate the cause of an error by means of both said operation data and said visual data. It is also possible to ascertain the situation at the site from a broad or detailed perspective, as is required.

What is claimed is:

1. A maintenance system for industrial machinery, wherein, when an error occurs in said industrial machinery, an advisor who is located at a distance from the site is enabled to instruct on-site operators as to the recovery procedure for said industrial machinery, said maintenance system comprising:

acquiring means for acquiring operation data and images and for recording operation data of the industrial machinery and images filmed by a filming means;

a central computer into which the advisor is able to collect the operation data and the images acquired by said means through a telecommunications circuit; and communications means for enabling said advisor to issue instructions to on-site operations.

2. A maintenance system for industrial machinery, wherein, when an error occurs in said industrial machinery, an advisor who is located at a distance from the site is enabled to instruct on-site operators as to the recovery procedure for said industrial machinery, said maintenance system comprising:

acquiring means for acquiring operation data and images and for recording operation data of the industrial machinery and images filmed by a filming means;

a central computer into which the advisor is able to collect and download the operation data and the images acquired by said means through a telecommunications circuit; and communications means for enabling said advisor to issue instructions to on-site operations.

3. The maintenance system for industrial machinery according to claim 2, wherein, after the investigation into the cause of the error occurring in the industrial machinery, the filmed images of the site are downloaded by means of a telecommunications circuit, and notification of the recovery procedure is carried out while reference is made to said filmed images for verification.

4. A maintenance system for industrial machinery, wherein, when an error occurs in said industrial machinery, an advisor who is located at a distance from the site is enabled to instruct on-site operators as to the recovery procedure for said industrial machinery, said maintenance system comprising:

acquiring means for acquiring the operation data of the aforementioned industrial machinery;

a central computer into which the advisor, by means of a telecommunications circuit, is able to collect said operation data acquired by said acquiring means; and communications means for enabling said advisor to issue instructions to on-site operators.

5. The maintenance system for industrial machinery acceding to claim 4, wherein, at the same time as acquiring the operation data, establishing a means of filming the site, wherein filmed images can be downloaded into a central computer by means of a telecommunications circuit.

6. The maintenance system for industrial machinery according to claim 5, wherein, at the same time as filming the sites establishing a means of visual data recording for the recording of filmed images captured by means of filming, said visual data recorded by said means of visual data recording can be downloaded by the advisor into the central computer by means of a telecommunications circuit, and wherein said visual data can be replayed in said central computer.

7. The maintenance method for industrial machinery according to claim 5, wherein the advisor is able to carry out panning and zooming operations of said means of filming by means of a telecommunications circuit.

* * * * *